United States Patent [19]

Nosler

[11] 4,221,973
[45] Sep. 9, 1980

[54] LINEAR ARRAY SIGNAL PROCESSING CIRCUITRY FOR LOCATING THE MIDPOINT OF A SOURCE OF LIGHT

[76] Inventor: John C. Nosler, 2587 Floral Hill Dr., Eugene, Oreg. 97403

[21] Appl. No.: 972,804

[22] Filed: Dec. 26, 1978

[51] Int. Cl.² ............................................. G01N 21/30
[52] U.S. Cl. ................................... 250/560; 250/561; 356/387
[58] Field of Search .................. 250/203 R, 208, 209, 250/560, 561, 578; 356/384, 385, 386, 387

[56] References Cited

U.S. PATENT DOCUMENTS

| | | | |
|---|---|---|---|
| 3,944,814 | 3/1976 | Goto | 250/203 R |
| 4,105,925 | 8/1978 | Rossol et al. | 250/561 |
| 4,129,384 | 12/1978 | Walker et al. | 356/387 |

Primary Examiner—David C. Nelms
Attorney, Agent, or Firm—Kolisch, Hartwell & Dickinson

[57] ABSTRACT

Circuitry for locating the mid-point of a spot of illumination on a time-base-scanned linear photodetector (photodiode) array. With each scan, the array produces, from the illuminated photodiodes, a pulse made up of individual "pixils" having different discreet DC voltage levels. This pulse is filtered to smooth it, and is then compared with a DC reference to produce a related square-wave pulse whose length depends on the time that the level of the filtered pulse exceeds that of the reference. Clock pulses at two different frequencies are provided, and are counted (at different times) from the beginning of each scan until the end of such a square-wave pulse. The desired mid-point is determined from the total count obtained during a scan.

5 Claims, 3 Drawing Figures ically to circuitry usable with a linear photodetector array employed in such apparatus to determine the geometric mid-point of a spot of illumination cast onto the array.

LINEAR ARRAY SIGNAL PROCESSING CIRCUITRY FOR LOCATING THE MIDPOINT OF A SOURCE OF LIGHT

BACKGROUND AND SUMMARY OF THE INVENTION

This invention pertains to electro-optical position-measuring apparatus, and more particularly to circuitry usable with a linear photodetector array employed in such apparatus to determine the geometric mid-point of a spot of illumination cast onto the array.

A preferred embodiment of the invention is described herein in conjunction with determining the position of a log in a plywood mill, prior to the log being fed to a veneer peeler.

There are a number of applications, one of which has just been mentioned, where it is desired to locate the position of an object, or more specifically the position of a surface of the object, in space. Electro-optical systems have been proposed which are usable to perform this function, and at least one is known to employ what is referred to as a linear photodetector array. In this known system, a laser beam is directed toward the object of interest, and an optical system projects a reflected image of the point of impingement of the beam and the object onto the array. The system is arranged whereby the location of the imaged reflection along the array is directly interpretable to indicate the position of the impinged surface of the object.

Linear photodetector arrays are also used in a number of other kinds of apparatus wherein images, of one form or another, are projected onto the array.

In a substantial number of such applications, using an array of the type indicated, it is intended to determine as accurately as possible the geometric mid-point of the imaged spot of illumination on the array. Determination of this midpoint, obviously, is necessary to obtain maximum accuracy in whatever positioning measurement is being made.

A general object of the present invention is to provide unique circuitry for processing an output signal produced by such an array to determine the geometric mid-point of a spot of illumination thereon with an extremely high degree of accuracy.

Yet another object of the invention is to provide such circuitry which is relatively simple and inexpensive, yet highly reliable.

Still a further object of the invention is to provide such circuitry which can be used easily with substantially any available photodetector array, and in substantially any application where such an array is used in the manner generally described above.

According to a preferred embodiment of the invention, the circuitry thereof responds to the usual pulse-like signal produced during each scan cycle for such an array. As is well understood by those skilled in the art, such a signal is made up of what are known as individual "pixils"—one of these being produced for each illuminated photodiode in the array—and each pixil being characterized by a discreet DC voltage level. Near the "center of the pulse," it is probable that the voltage levels of most pixils will be substantially the same. The opposite edges of the pulse are derived from those pixils on the fringes of the spot of illumination, and will normally show distinctly different discreet levels. Also, a pulse derived from such an array will normally be asymmetric.

According to the invention, the output pulse thus provided by an array is filtered to smooth it, and is then compared with a DC reference voltage for the purpose, ultimately, of generating a square-wave pulse whose length depends upon the time that the level of the filtered pulse exceeds that of the reference voltage.

Included in the circuitry of the invention is a clock-pulse generator having at least two outputs, on one of which it provides clock pulses at one frequency, and on the other of which it provides clock pulses at another frequency which is one-half the first-mentioned frequency. During each scan cycle for the array, pulses at the higher frequency are counted during the time span beginning with the initiation of the cycle and ending with the initiation of a square-wave pulse (just above mentioned). Thereafter, pulses at the lower frequency are counted throughout the duration of the square-wave pulse. No further counting during a scan cycle occurs.

The total count so obtained during a scan cycle is directly readable to indicate the geometric mid-point of the spot of illumination on the array.

With such circuitry, an extremely accurate mid-point determination can be made. For example, a typical linear array might include, for each inch of length of the array, 1300 side-by-side photodiodes. Each such photodiode, when illuminated, produces what has been referred to above as a pixil in the output signal from the array—with the level of the pixil dependent upon the level of illumination on the particular diode, and the time-width of the pixil dependent upon the scanning rate. Utilizing the circuitry of the invention to determine spot illumination mid-point, this determination can be made within about one-tenth of a pixil width.

As will shortly become apparent, the circuitry proposed herein is extremely simple and can be assembled in very compact form.

These and other objects and advantages which are attained by the invention will become more fully apparent as the description which now follows is read in conjunction with the accompanying drawings.

DETAILED DESCRIPTION OF THE INVENTION

Figure 1:
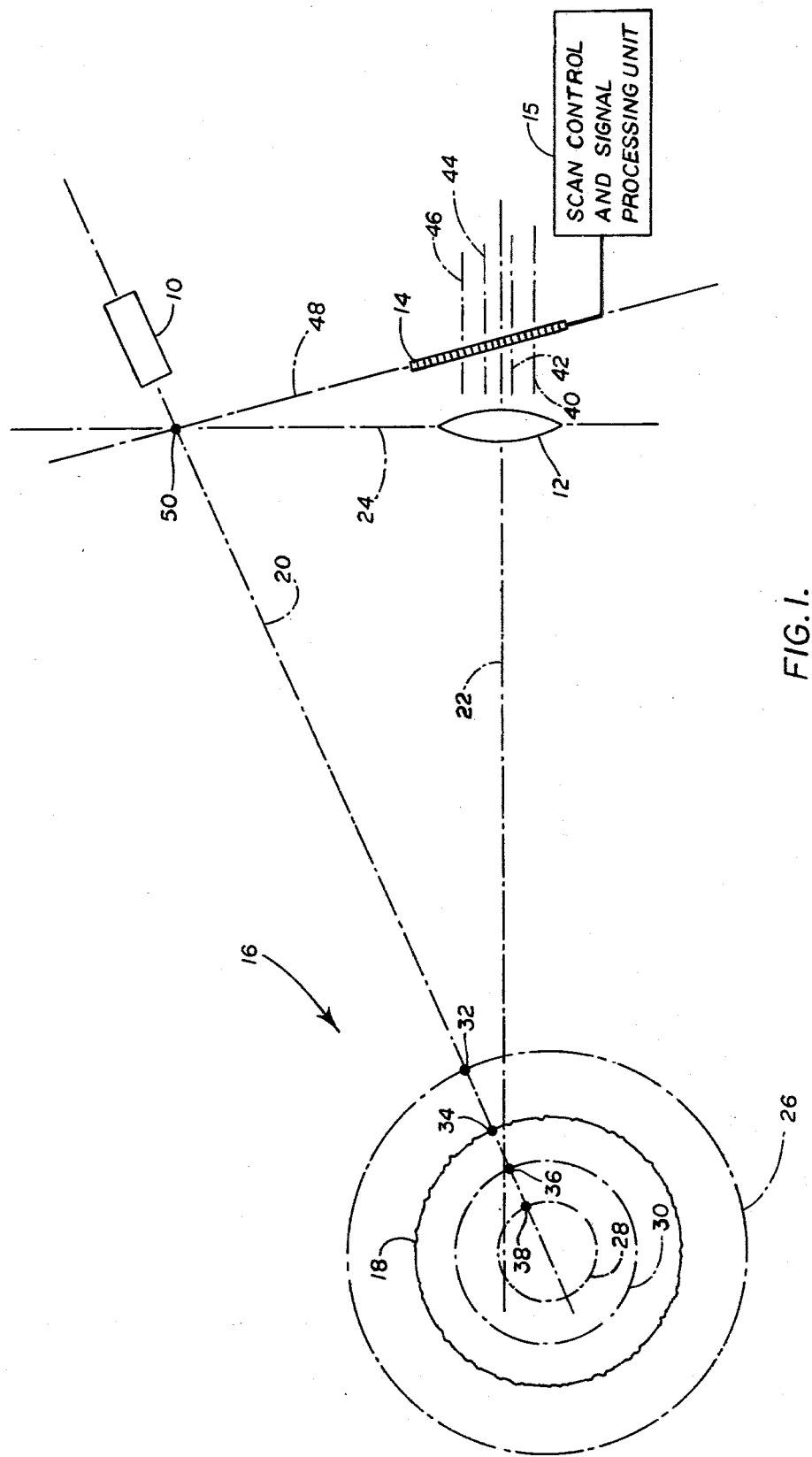
FIG. 1 is a schematic drawing generally illustrating, in the setting of a veneer mill, a log-position measuring apparatus employing signal-processing circuitry constructed in accordance with the present invention.

Turning now to the drawings, and referring first to FIG. 1, what is shown herein is a side schematic view illustrating components of a distance-measuring apparatus used in a plywood mill to assist in what is known as a block-centering operation. The parts are not drawn to scale. Included within the apparatus are a laser 10, a lens 12, a linear photodetector array 14, and a scan control and signal processing unit 15 including circuitry constructed in accordance with the present invention.

Indicated generally at 16 is what might be thought of as a viewing zone in which the apparatus is intended to monitor the positions of the near sides of logs. A log within this zone is shown (end view) at 18.

Laser 10 is positioned and oriented to project a small-diameter beam (typically about 1.5-millimeters) along a projection axis shown at 20. Axis 20 extends into zone 16, and occupies the plane of the drawing.

Lens 12 is positioned and oriented to view zone 16 generally along a central viewing axis shown at 22. Axis 22 intersects axis 20, and also lies in the plane of the drawing. Lens 12 herein is a circular, double-convex lens which lies in a plane 24 that is normal both to the plane of the drawing, and to axis 22.

The apparatus of FIG. 1 is designed to offer a preselected dynamic viewing range suited to the particular setting in which it is employed. In the specific example now being described, the apparatus shown is used to locate the near surfaces of logs whose diameters lie within the range of about 8-inches to about 48-inches. Logs presented in viewing zone 16 will, through conventional log-handling apparatus, normally be placed in zone 16 with their approximate central axes always closely aligned with a predetermined axis that extends (at a known location) through the viewing zone (substantially normal to the plane of the drawing). Thus, with logs having such a range of expected diameters, the required dynamic range for the illustrated system is about 20-inches.

Referring to the left side of the drawing, circular line 26 represents one "end" of the selected dynamic range, and line 28 represents the other "end." More specifically, a log having a diameter of about 48-inches would, as viewed in the drawing, have its outside generally coincident with line 26. On the other hand, an 8-inch diameter log similarly viewed would have its outside generally coincident with line 28. Line 30 represents a log having a diameter of about 24-inches. Log 18 has a diameter of about 38-inches.

Still with reference to the left side of the drawing, it can be seen that axis 20 intersects line 26 at a point 32, intersects the near surface of log 18 at a point 34, intersects line 30 at a point 36, and intersects line 28 at a point 38. These points are, of course, merely representative of the infinite number of points, between points 32, 38, where the beam from laser 10 could intersect, or impinge, the side of a log in zone 16.

With respect to the four particular points just mentioned, and considering the operation of lens 12, the lens, on its right side, images a beam-impingement occurring at point 32 along a line 40, images an impingement at point 34 with log 18 along a line 42, images an impingement at point 36 along a line 44, and images an impingement at point 38 along a line 46. Lines 40, 42, 44, 46 all lie in the plane of the drawing.

The exact angle which is used between axes 20, 22 is a matter of choice, and depends upon the specific application in which the apparatus is to be used. Generally speaking, and considering the use of a photodetector array having a particular length, the greater this angle, the smaller the dynamic range and the greater the optical resolution. Conversely, the smaller the angle, the greater the dynamic range and the poorer the optical resolution. In the particular application now being described, wherein the dynamic range is about 20 inches, the angle between these axes is about 14.5°.

Another factor which is a matter of choice, and which depends upon the particular application for the apparatus, is the distance of the apparatus from the viewing zone. In the particular apparatus illustrated herein, lens 12 is located about 60-inches from previously mentioned point 38.

In the particular apparatus shown in FIG. 1, and for reasons which do not concern the present invention, the surface of array 14 which faces lens 12 lies along a line which intersects axis 20 at the same point where axis 20 is intersected by the plane containing lens 12. Such a line for the array is represented by line 48, and can be seen to intersect axis 20 and plane 24 at a point 50. The reasons for this kind of arrangement are discussed in my co-pending patent application Ser. No. 973,227, filed Dec. 26, 1978, for "Electro-Optical Distance-Measuring System".

Explaining now generally the operation of what has so far been described, it can be seen that a reflected image of the laser beam is projected as a spot onto array 14, with the position of this spot depending upon the diameter of the particular log being viewed in zone 16. More particularly, and with specific reference to the several illustrated beam-impingement points, the imaged reflection from impingement point 34 with log 18 strikes the photodetector where the same is intersected by line 42. An image derived from point 36 strikes the photodetector where it is intersected by line 44. One derived from point 38 strikes the photodetector where it is intersected by line 46. And, one derived from point 32 strikes the photodetector where the same is intersected by line 40.

Forming a part of previously mentioned unit 15 is a conventional scanning circuit usable in a known way with array 14. This circuit, when supplied with scanning pulses, serially and repetitively scans through the array from one end to the other, and derives from the photodetector an output signal or pulse in the form of side-by-side adjacent pixils wherever the photodetector is illuminated. Further, at the beginning of each scan cycle for the array, the scanning circuitry produces a marker pulse to indicate the beginning of the scan cycle.

Figure 3:
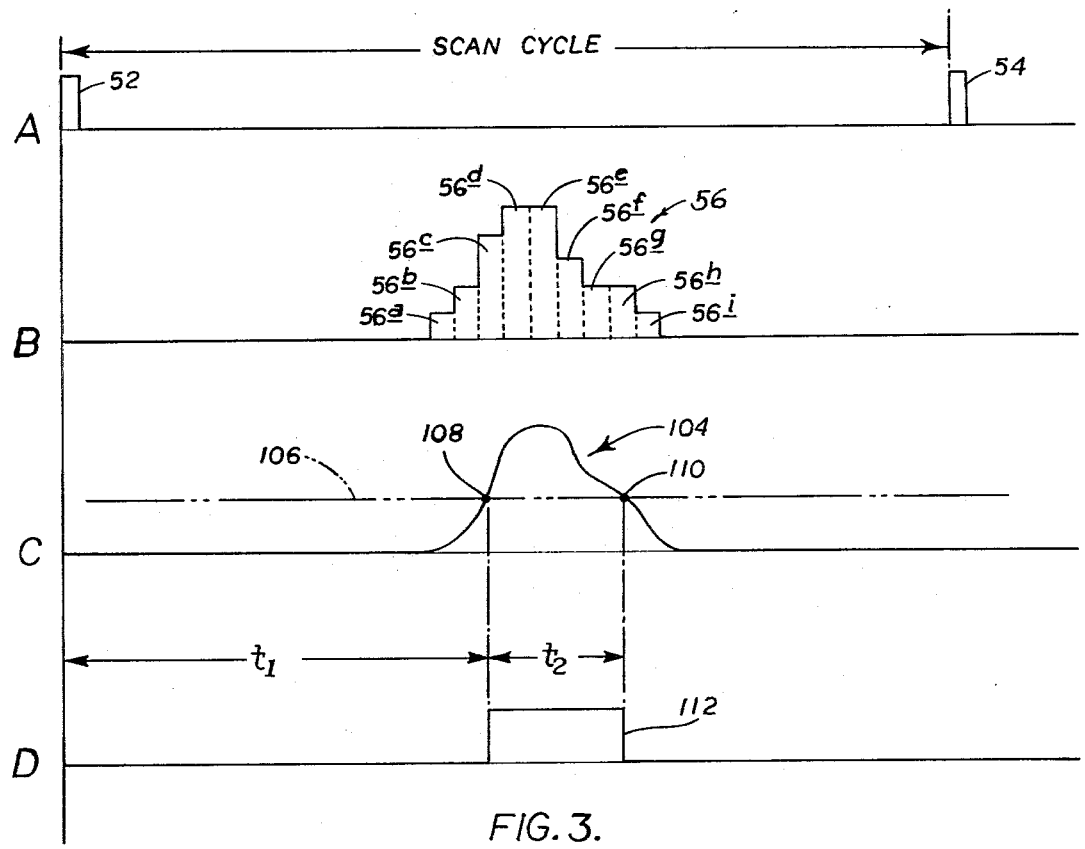
FIG. 3 is a time-base graph illustrating the operation of the circuitry of FIG. 2.

Referring for a moment to FIG. 3, and particularly to what is shown along the time bases marked A, B therein, two such marker pulses are shown at 52, 54 along time base A. Each of these pulses initiates a scan cycle for the array, and the duration of a single scan cycle is marked along this time base. Indicated generally at 56 along time base B is an output pulse, or signal, derived from the reflected spot which is imaged onto array 14 as a result of laser beam impingement at 34 with log 18. For the sake of simplicity, signal 56 is represented as being made up of nine pixils, these being designated 56a, 56b, 56c, 56d, 56e, 56f, 56g, 56h, 56i. It can be seen that different ones of these pixils have different specific discreet voltage levels, with some of the pixils having substantially the same voltage level as certain others. It will be noted that signal 56 has what might be thought of as a somewhat staircase configuration, and that the signal is asymmetric about its time mid-point. Two of the middle-region pixils, namely 56d, 56e have the highest voltage levels (which are substantially the same). The important function of the circuitry of the present invention, now to be described in detail, is to process a signal such as signal 56 to determine, through locating its time mid-point, the geometric location of the mid-point of the spot of illumination on array 14 which produces such a signal.

Figure 2:
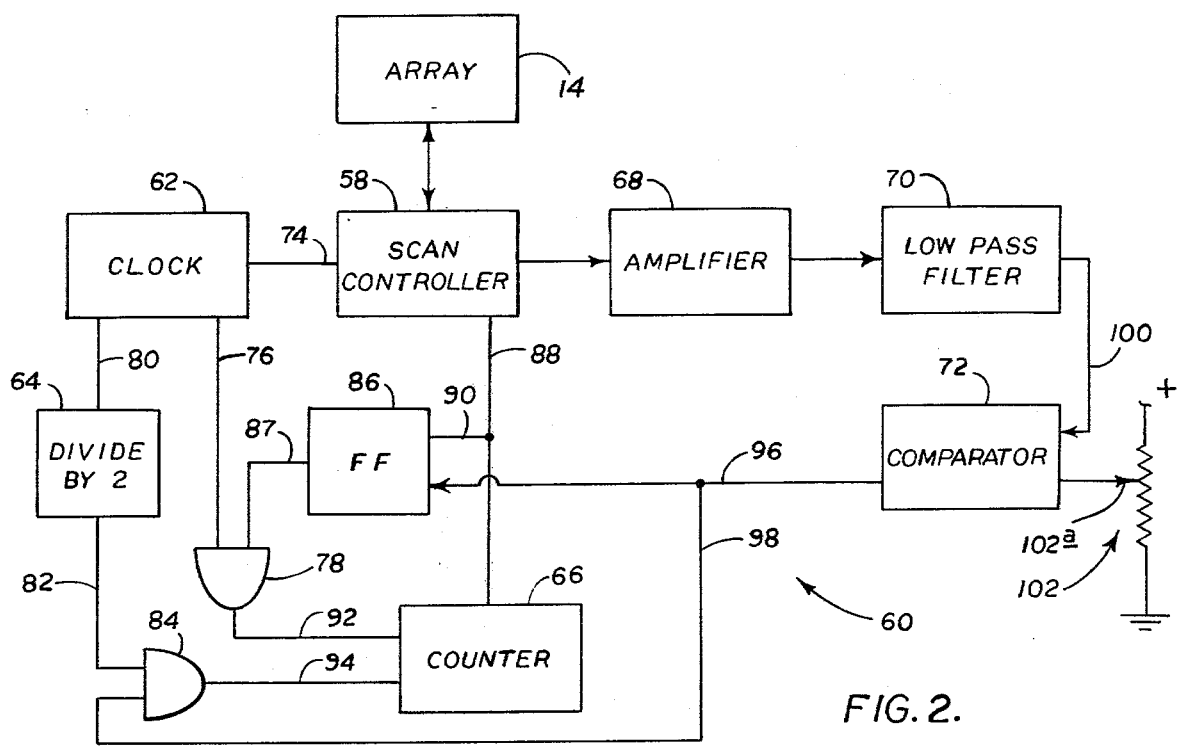
FIG. 2 is a block/schematic diagram illustrating the circuitry of the invention.

Turning attention now to FIG. 2, linear array 14 is represented in block form, and is shown connected to what has above been referred to as conventional scanning circuit, represented by a block 58 and marked "Scan Controller." The circuitry proposed by the present invention is indicated generally at 60, and is connected, as will be explained, to scan controller 58.

Included within circuitry 60 are a clock 62, a frequency divider 64, a pulse counter, or counter means, 66, an amplifier 68, a low-pass filter, or filtering means, 70 and a comparator, or comparator means, 72. Comparator 72 is also referred to herein as a square-wave producing means.

Clock 62 operates at the frequency of 10-megahertz, and includes plural outputs, one of which is connected via a conductor 74 to the clock-pulse input of scan controller 58, another of which is connected by a conductor 76 to one of the inputs in a two-input AND-gate 78, and a third of which is connected by a conductor 80 to the input of frequency divider 64. The output of divider 64 is connected via a conductor 82 to one of the inputs in another two-input AND-gate 84. Clock 62 and divider 64 are referred to herein collectively as a clock-pulse generating means. Conductor 76 is referred to as a first clock-pulse means, and conductor 82 as a second clock-pulse means.

On each of conductors 74, 76, 80, clock 62 supplies pulses at the frequency mentioned above. Frequency divider 64 divides this frequency in two, and applies to conductor 82 clock pulses at the frequency of 500-kilohertz.

The other input in AND-gate 78 is connected to the output of a conventional flip-flop 86. What will be referred to as the marker pulse output of scan controller 58 is connected via a conductor 88 to the reset input in counter 66, and via conductor 88 and a conductor 90 to the set input in flip-flop 86.

Counter 66 includes two inputs, one of which is connected via a conductor 92 to the output of gate 78, and the other of which is connected through a conductor 94 to the output of gate 84.

The output of comparator 72 is connected via a conductor 96 to the reset input in flip-flop 86, and via conductor 96 and a conductor 98 to the other input in AND-gate 84.

Completing a description of what is shown in FIG. 2, the array-derived signal output of scan controller 58 is connected to the input of amplifier 68, the output of which connects with the input of filter 70. The output of filter 70 is connected via a conductor 100 to one of the two inputs provided in comparator 72. The other input in the comparator is connected to the wiper, 102a, of a variable resistor 102—one end of which is grounded as shown, and the other end of which is supplied with a suitable positive voltage. Resistor 102 is also referred to herein as a DC reference voltage producing means. Filter 70 has a time constant of about $2.2 \times 10^{-6}$ seconds.

The individual blocks shown in FIG. 2 which make up circuitry 60 are conventional in construction.

Explaining now the operation of what is shown in FIG. 2, and considering FIG. 3 along with FIG. 2, when the position-monitoring apparatus is operating, scan controller 58 recurrently scans array 14 at the scan rate of 10-megahertz—applying a marker pulse, such as pulses 52, 54 (see FIG. 3) to conductor 88 at the beginning of each scan cycle, and applying to the input of amplifier 68 a signal, such as signal 56 (see FIG. 3), whenever it detects a spot of illumination somewhere on the array. Considering the situation with signal 56 derived from the array, this signal, as it appears on time base B in FIG. 3, is applied to the input of the amplifier, wherein it is amplified to a suitable level for inputting to filter 70. Filter 70 acts to smooth out the "staircase" nature of signal 56, and more specifically, produces what is referred to herein as a DC analogue pulse, such as pulse 104 shown along time base C in FIG. 3. Pulse 104 is in fact the analogue pulse which is produced through filter 70 from signal 56. Pulse 104 is applied to comparator 72.

Shifting focus for a minute to the utilization of clock pulses in circuitry 60, at the beginning of the scan cycle illustrated in FIG. 3, the leading edge of marker pulse 52 sets flip-flop 86 and resets counter 66 to a zero-count condition. Setting of the flip-flop causes a positive voltage to appear on conductor 87, which situation opens gate 78. Accordingly, at the beginning of this scan cycle, gate 78 passes to the upper input in counter 66 clock pulses at the frequency of 10-megahertz. Also, counter 66 begins counting these pulses from a zero-count condition.

So long as the level of the voltage supplied comparator 72 from filter 70 does not exceed the reference voltage level set through adjustment of resistor 102, the output of the comparator remains in substantially a ground-potential state. This condition causes gate 84 to be held closed. Hence, no pulses for counting are supplied to the lower input in counter 66.

With reference to time base C in FIG. 3, a dash-double-dot line 106 represents the reference voltage level set for the comparator. It will be seen that pulse 104 intersects this line at points 108, 110. Thus, when, in time, pulse 104 reaches point 108, and thereafter in time until it returns through point 110, the voltage level of this pulse is greater than that of the reference voltage. Under these circumstances, comparator 72 produces a positive voltage state on its output, which state is applied to the reset input in flip-flop 86 and to the lower input in gate 84. This condition for the output of comparator 72 is represented by a square-wave pulse 112 shown along time base D in FIG. 3. It will be noted that the duration of this pulse is the same as the time that the voltage level of pulse 104 remains above the reference voltage level represented by line 106.

When the output of comparator 72 is thus switched to a positive-voltage state, the resetting which then results in flip-flop 86 cause closure of gate 78. Further, the change in the output state of the comparator opens gate 84, whereupon pulses at the frequency of 500-kilohertz are supplied counter 66 through its lower input in FIG. 2. Accordingly, throughout the time that the positive voltage state exists on the output of comparator 72, counter 66 continues to count pulses, but at the lower frequency. This time space, of course, coincides with the length of square-wave pulse 112.

At the termination of pulse 112, the output of comparator 72 returns to a substantially ground-potential state, whereupon gate 84 is again closed. Inasmuch as both gates 78, 84 are now closed, no further counting occurs in the counter throughout the remainder of the scan cycle. Thus, and referring once more to FIG. 3, and specifically to time base D therein, during the first portion of the scan cycle beginning with initiation of the cycle, and ending with the beginning of pulse 112 (this time being designated $t_1$), counter 66 counts pulses at the frequency of 10-megahertz. Thereafter, and only until the end of pulse 112, namely, throughout a time span designated $t_2$, the counter counts pulses at the half-frequency rate of 500-kilohertz. The sum of these two counts is directly readable to indicate the time mid-point of pulses 56, 104, and hence the geometric mid-point of the spot of illumination on array 14 which produced pulse 56. As was mentioned earlier, the particular circuitry which has just been illustrated and described is capable of locating this geometric mid-point to within 0.1-pixil width.

Naturally, the operating frequencies in the circuitry, and the specific voltage levels which are used therein are a matter of choice and may be varied to suit different circumstances.

Further, it will be obvious that circuitry 60 can readily be used with a wide variety of conventional photodetector arrays, and scan controllers therefor. Each of the circuit components represented in block form in FIG. 2, and forming part of circuitry 60, can be assembled in very compact form. Also, and inasmuch as each of these individual subunits is conventional in construction, special construction which might lead to reliability problems is not required.

While a preferred embodiment of the invention has been described, it is appreciated that variations and modifications may be made without departing from the spirit of the invention.

It is claimed and desired to secure by letters patent:

1. Processing circuitry for locating the geometric mid-point of an illuminated stretch of a linear photodetector array, where the array is scanned in a scanning cycle to provide, from such illumination, a signal taking the form of plural, time-adjacent, discreet DC voltage levels, said circuitry, in operative condition with respect to such an array, comprising
    means operatively connected to said array for filtering such a signal to produce a related DC analogue pulse lacking discreet voltage levels,
    means operatively connected to said filtering means for producing a square-wave pulse having a duration directly related to the time that the level of such an analogue pulse exceeds a predetermined voltage level, and
    means operatively connected to said square-wave pulse-producing means for determining the time mid-point thereof.

2. The circuitry of claim 1, wherein said determining means includes a clock-pulse generating means, and a counter operatively connected thereto for counting clock pulses generated thereby during a portion of such a scanning cycle.

3. The circuitry of claim 2, wherein said counter is constructed whereby said portion of a scanning cycle begins at the beginning of the cycle and ends at the termination of such a square-wave pulse.

4. The circuitry of claim 3, wherein said counter includes a pair of counting inputs, said clock-pulse generating means includes a pair of outputs each operatively connected to a different one of said inputs, one of said outputs supplying clock pulses at one frequency for counting from the beginning of a scan cycle to the beginning of a square-wave pulse, and the other output supplying clock pulses at another frequency, which is one-half said one frequency, for counting throughout the duration of such a square-wave pulse.

5. Processing circuitry for locating the geometric mid-point of a signal derived from a time-base-scanned linear photodetector array, where scanning of the array occurs in recurrent scanning cycles, and such a signal takes the form of plural, time-adjacent, discreet DC voltage levels, said circuitry, in operative condition with respect to such an array, comprising
    filter means operatively coupled to said array, operable to produce from such a signal a related analogue DC pulse lacking discreet voltage levels,
    means for producing a DC reference voltage,
    comparator means operatively connected both to said filter means and to said reference voltage producing means, operable to compare such a pulse with said reference voltage, and to provide from such comparing a square-wave pulse having a duration directly related to the length of time that the level of such an analogue pulse exceeds that of said reference voltage,
    first clock-pulse means producing clock pulses at one frequency,
    second clock-pulse means producing clock pulses at another frequency which is one-half said one frequency, and
    counter means operatively connected to said comparator means and to said first and second clock-pulse means, operable, during each scanning cycle, to count pulses received from said first clock-pulse means from the beginning of the cycle to the beginning of a square-wave pulse produced by said comparator means, and thereafter to count pulses received from said second clock-pulse means throughout the duration of such a square-wave pulse.

* * * * *